W. H. H. BARTON.
Implement for Expelling the Joint-Pin from Hinges.
No. 133,821. Patented Dec. 10, 1872.
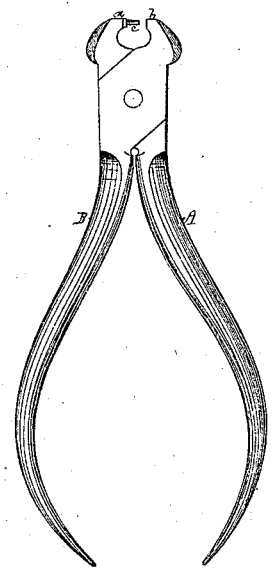
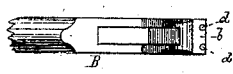
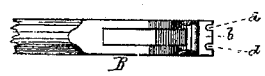
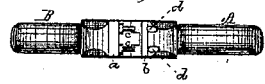
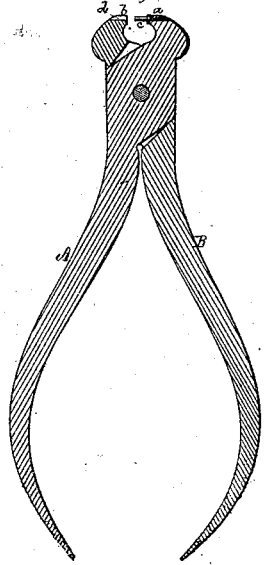
Witnesses,
S. W. Piper
L. N. Möller
William H. H. Barton
by his attorney
R. H. Eddy

UNITED STATES PATENT OFFICE.

WILLIAM H. H. BARTON, OF UXBRIDGE, MASSACHUSETTS.

IMPROVEMENT IN IMPLEMENTS FOR EXPELLING THE JOINT-PIN FROM HINGES.

Specification forming part of Letters Patent No. 133,821, dated December 10, 1872.

*To all whom it may concern:*

Be it known that I, WILLIAM H. H. BARTON, of Uxbridge, of the county of Worcester, of the State of Massachusetts, have invented a new and useful Implement for Expelling from a Hinge the Joint-Pin thereof; and I do hereby declare the same to be fully described in the following specification and represented in the accompanying drawing, of which—

Figure 1 is a side elevation; Fig. 2, an end view; Fig. 3, a longitudinal section of the said implement. Fig. 4 is a view of the face of its perforated jaw, and Fig. 5 exhibits a modification of such jaw.

Jewelers, as well as others, frequently have occasion to remove the joint-pin from the hinge of a breastpin or other small article, such being usually attended with considerable trouble and the exercise of much care. With my implement such can be easily and expeditiously effected.

The implement in question is somewhat in shape and construction like a pair of wire-cutting pliers, but instead of the jaws being sharp and meeting together when the implement is closed, they are formed with flat faces, between which there is a space somewhat wider than the length of the plunger or each of the plungers projecting from one of the jaws.

The drawing represents such pliers, composed of two levers, A B, formed and jointed together like those of cutting-pliers, except that the jaws *a b*, when the implement is closed, are arranged with a space between them, and they are formed with parallel faces at opposite sides of such space. From one of these faces one or more teeth or round plungers, *c*, project, in manner as shown, toward the other face, the jaw of which opposite to the plunger or each of the plungers is perforated with a round hole, *d*, as shown in Figs. 3 and 4, or with a slit, *d*, as represented in Fig. 5, such hole or slit having a diameter or width a little greater than that of its plunger. It will be perceived that the said hole is made very near the outer edge of the jaw.

To use the implement, the jaws are to be opened apart and placed upon the hinge-joint of an article so as to embrace opposite ends of such joint and with the plunger and the discharging hole thereof in line with the hinge-pin. On pressing the longer arms of the two levers toward each other the plunger will be caused to so act against one end of the hinge-pin as to expel the pin from the joint partially or wholly, such pin being driven into the discharge hole or slit of the jaw which is opposite to that from which the plunger may extend.

When there are two or more plungers to a jaw they may be of different sizes or diameters, their discharge-holes being in correspondence.

I claim as my invention—

The new manufacture or hinge-joint pin-expelling implement, substantially as described, consisting of the crossed and pivoted levers A B having jaws *a b*, as described, and one or more holes *d* through one jaw, and one or more studs or plungers *c* extending from the other jaw, and with reference to the said hole or holes thereof, all being essentially as set forth.

WILLIAM H. H. BARTON.

Witnesses:
R. H. EDDY,
J. R. SNOW.